(12) United States Patent
Galea et al.

(10) Patent No.: US 11,003,470 B1
(45) Date of Patent: May 11, 2021

(54) IMPLEMENTING STICKY NOTES ASSOCIATED WITH REMOTELY EXECUTED APPLICATIONS

(71) Applicant: Parallels International GmbH, Schaffhausen (CH)

(72) Inventors: Stefania Galea, Sliema (MT); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 303 days.

(21) Appl. No.: 15/911,444

(22) Filed: Mar. 5, 2018

(51) Int. Cl.
| | |
|---|---|
| *G06F 9/451* | (2018.01) |
| *G06F 9/455* | (2018.01) |
| *G06F 9/54* | (2006.01) |
| *G06F 21/31* | (2013.01) |
| *G06F 3/0483* | (2013.01) |

(52) U.S. Cl.
CPC ............ *G06F 9/452* (2018.02); *G06F 3/0483* (2013.01); *G06F 9/45545* (2013.01); *G06F 9/547* (2013.01); *G06F 21/31* (2013.01)

(58) Field of Classification Search
CPC ...... G06F 9/452; G06F 9/547; G06F 9/45545; G06F 21/31; G06F 3/0483
See application file for complete search history.

(56) References Cited

U.S. PATENT DOCUMENTS

| | | | | |
|---|---|---|---|---|
| 7,734,722 B2* | 6/2010 | Seidl | ...................... | G06F 16/958 709/218 |
| 8,375,320 B2* | 2/2013 | Kotler | .................. | G06Q 10/109 709/206 |
| 9,817,991 B2* | 11/2017 | Boncha | ............... | G06F 21/6218 |
| 10,013,406 B2* | 7/2018 | Graf | ..................... | G06F 3/04845 |
| 10,062,384 B1* | 8/2018 | Sugiura | ................ | G06K 9/4642 |
| 2006/0239248 A1* | 10/2006 | Hawk | ..................... | H04L 67/36 370/352 |

(Continued)

FOREIGN PATENT DOCUMENTS

| | | | | |
|---|---|---|---|---|
| JP | | 2012198798 A | * 10/2012 | |
| WO | WO-2010010967 A1 | * 1/2010 | ............. | H04L 51/22 |
| WO | WO-2016151921 A1 | * 9/2016 | ............. | G06F 16/00 |

OTHER PUBLICATIONS

"Parallels Remote Application Server", Solutions Guide v15.5, https://www.parallels.com/fileadmin/docs/ras/resources/Parallels-RAS-v15-5-Solutions-Guide.pdf, 43 pages, 1999-2017.

(Continued)

*Primary Examiner* — Kostas J Katsikis
(74) *Attorney, Agent, or Firm* — Rosenberg, Klein & Lee

(57) ABSTRACT

Systems and methods for implementing sticky notes associated with remotely executed applications. An example method comprises: receiving, by a client gateway, a request initiated by a client to launch a published application executable by a virtual execution environment; retrieving, from a publishing server associated with the virtual execution environment, a plurality of sticky note definition records, wherein each sticky note definition record of the plurality of sticky note definition records defines a sticky note associated with the published application; and causing the client to render, in a visual association with a window of the published application, a popup window representing a sticky note defined by a sticky note definition record of the plurality of sticky note definition records.

19 Claims, 7 Drawing Sheets

(56) References Cited

U.S. PATENT DOCUMENTS

| | | | | |
|---|---|---|---|---|
| 2007/0011340 | A1* | 1/2007 | Seidl | G06F 16/958 709/228 |
| 2008/0222552 | A1* | 9/2008 | Batarseh | G09B 5/02 715/776 |
| 2009/0055737 | A1* | 2/2009 | Borchardt | G06F 40/169 715/708 |
| 2009/0271731 | A1* | 10/2009 | Lin | G06F 3/04883 715/776 |
| 2010/0153887 | A1* | 6/2010 | Yamaguchi | G06Q 10/00 715/854 |
| 2011/0115825 | A1* | 5/2011 | Tetsuhashi | H04L 51/22 345/672 |
| 2011/0184960 | A1* | 7/2011 | Delpha | G06F 40/169 707/754 |
| 2011/0314404 | A1* | 12/2011 | Kotler | G06Q 10/109 715/772 |
| 2012/0030553 | A1* | 2/2012 | Delpha | G06F 40/169 715/205 |
| 2012/0084455 | A1* | 4/2012 | McCue | H04N 21/235 709/231 |
| 2013/0205189 | A1* | 8/2013 | DiPierro | G06F 3/0483 715/224 |
| 2013/0290841 | A1* | 10/2013 | Yamazoe | G06Q 10/101 715/273 |
| 2014/0115439 | A1* | 4/2014 | Delpha | G06F 40/169 715/230 |
| 2014/0172808 | A1* | 6/2014 | Burge | G06F 21/604 707/694 |
| 2014/0281936 | A1* | 9/2014 | Wallis | G06F 3/0483 715/251 |
| 2014/0336786 | A1* | 11/2014 | Asenjo | G05B 19/4185 700/17 |
| 2015/0095717 | A1* | 4/2015 | Frenz | H04N 7/183 714/46 |
| 2015/0106739 | A1* | 4/2015 | Tan | G06F 21/32 715/750 |
| 2015/0186351 | A1* | 7/2015 | Hicks | G06F 3/04842 715/232 |
| 2015/0332037 | A1* | 11/2015 | Tse | G06K 9/00288 726/19 |
| 2015/0347987 | A1* | 12/2015 | Ali | G06Q 10/1097 705/7.21 |
| 2016/0274553 | A1* | 9/2016 | Strohmenger | G05B 17/02 |
| 2016/0342579 | A1* | 11/2016 | Graf | G06T 11/001 |
| 2016/0342784 | A1* | 11/2016 | Beveridge | H04L 67/08 |
| 2017/0200018 | A1* | 7/2017 | Boncha | G06F 21/6218 |
| 2017/0315767 | A1* | 11/2017 | Rao | G06F 3/147 |
| 2017/0345224 | A1* | 11/2017 | Itou | G05B 23/0267 |
| 2018/0059889 | A1* | 3/2018 | Taniguchi | G06F 3/0481 |
| 2018/0137681 | A1* | 5/2018 | Chang | G06F 3/0482 |
| 2019/0130227 | A1* | 5/2019 | Blue | G06K 9/64 |

OTHER PUBLICATIONS

"Parallels Remote Appliction Server", Administrator's Guide v15.5 Update 2, https://download.parallels.com/ras/v15.5/docs/en_US/Parallels-RAS-v15-5-Administrators-Guide.pdf, 248 pages, 1999-2017.

"How Parallels Remote Application Server Enhances Microsoft RDS", White Paper, Parallels Remote Application Server, https://www.parallels.com/fileadmin/docs/ras/resources/WP_MaxRemoteDesktopServices_EN_A4.pdf, 11 pages, 2017.

* cited by examiner

| Sticky note ID 215 | App ID 220 | Owner ID 225 | Access mode 230 | User/group IDs 235 | Title 240 | Text 245 | Color 250 |
|---|---|---|---|---|---|---|---|
| 210A | | | | | | | |
| 210B | | | | | | | |
| 210M | | | | | | | |

IMPLEMENTING STICKY NOTES ASSOCIATED WITH REMOTELY EXECUTED APPLICATIONS

TECHNICAL FIELD

The present disclosure is generally related to virtualized computer systems, and is specifically related to systems and methods for implementing sticky notes associated with remotely executed applications.

BACKGROUND

Remote Desktop Services (RDS) and various other remote access solutions allow a user to connect over a network to a remote computer or virtual machine, thus making the entire desktop or one or more applications running on the remote computer or virtual machine accessible via a client application running on a client device. The client application is responsible for forwarding graphical user interface (GUI) events to the remote computer or virtual machine, as well as for rendering on the client screen the graphics received from the remote computer or virtual machine.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates an example sticky note definition data structure maintained by a publishing server operating in accordance with one or more aspects of the present disclosure;

DETAILED DESCRIPTION

Figure 1:
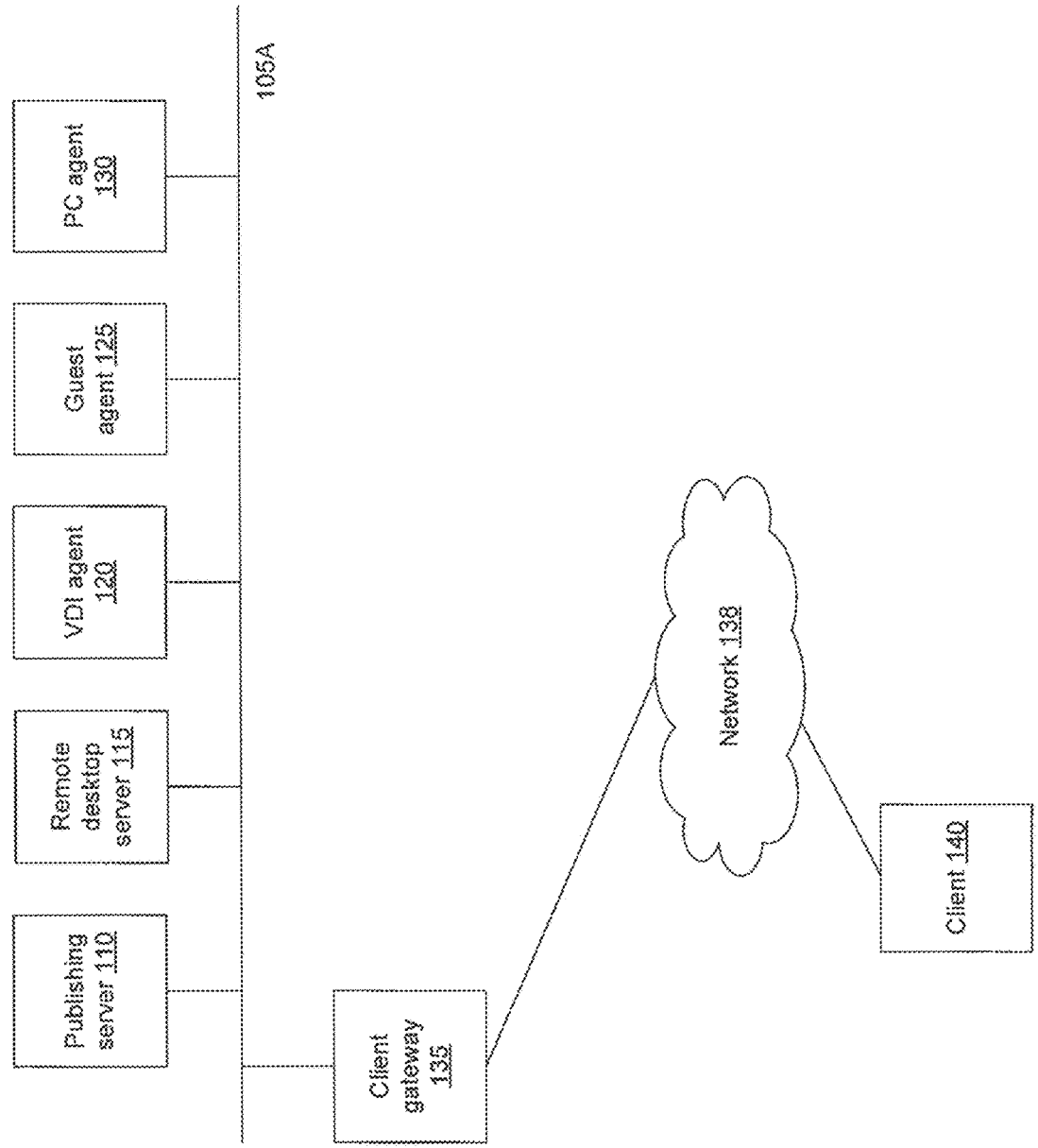
FIG. 1 schematically illustrates an example component diagram of a remote access infrastructure in which the methods and systems described herein may be implemented.

Described herein are systems and methods for implementing sticky notes associated with remotely executed applications. A "sticky note" herein shall refer to a popup window which, together with the associated code and underlying data structures, displays user notes, including text, graphics, and/or multimedia content. The name "sticky note" emphasizes the similarity between the functions and appearance of such pop-up windows and paper-based Post-It® sticky notes. Implementations of the current disclosure enable associating sticky notes with remote applications executed by virtual execution environments.

A publishing server, such as the publishing agent of the Parallels® Remote access server (RAS), may facilitate connections of client devices (such as personal computers or mobile devices) to various virtual execution environments that are running on one or more servers. In an illustrative example, a virtual execution environment may be implemented by a multi-user terminal server (also referred to as "remote desktop server"). In another illustrative example, a virtual execution environment may be implemented by a virtual desktop interface (VDI) agent running on a host computer system executing one or more virtual machines that are managed by a hypervisor (e.g., Hyper-V®, VMware®, or Xen®). In yet another illustrative example, a virtual execution environment may be implemented by a guest agent installed in a guest operating system of a virtual machine running on a host computer system. In yet another illustrative example, a virtual execution environment may be implemented by a remote personal computer (PC) agent running on a personal computer system.

A user may utilize a remote access client (such as Parallels® client) to connect to a remote application in order to access, via the Remote Desktop Protocol (RDP), remote applications running in one or more virtual execution environments. The publishing server may additionally provide client authentication, load balancing, and/or other features related to brokering the client connections to the virtual execution environments.

In certain implementations, the remote access infrastructure may further include a client gateway, which may be utilized for tunneling tunnel all application traffic through a single port and/or encrypting all traffic forwarded to client (e.g., by establishing a Secure Socket Layer (SSL) tunnel). In certain implementations, the client gateway may enable browser-based client access to remote applications running in the virtualized execution environments, by serving, to the client, a JavaScript code for parsing and displaying the data received from a virtual execution environment. Applications that are published by one or more virtual execution environment may be listed on a client-accessible web portal.

Thus, the user may employ a remote access client or a browser-based client to access a list of available remote applications that are running in one or more virtual execution environments. Responsive to receiving a user's selection of an application to be launched, the remote access server may identify a virtual execution environment (e.g., an RDS server or a VDI agent) for launching the application. Responsive to validating the user credentials supplied by the client, the virtual execution environments may start a remote access session. The client (optionally assisted by the client gateway in certain connection modes) may render the remote application windows, translate pointing device input into coordinates of the corresponding virtual execution environment, and/or process other graphical user interface (GUI) events.

The present disclosure enhances the user's experience by enabling sticky notes associated with remotely executed applications. In an illustrative example, responsive to receiving an application launching request initiated by the client, the client gateway may retrieve, from the publishing server, definitions of the sticky notes associated with the published application identified by the request. The client gateway may then identify a subset of retrieved sticky notes which are accessible by the user identified by the client request, including the sticky notes owned by the user, shared sticky notes which the user is authorized to access based on the content of the sticky note definition field specifying users and/or user groups which are authorized to access the sticky note having the shared access mode, and/or public sticky notes.

Responsive to identifying the sticky notes which are accessible by the user identified by the client request, the client gateway may cause the client to render each identified sticky note in a respective popup window visual association with the main window of the published application. In an illustrative example, the client gateway may transmit, to the client, executable code and/or graphic content for visually rendering the identified sticky notes. The executable code may be represented, e.g., by JavaScript code executable by the client browser for rendering the sticky notes. The graphic content may include definitions of the popup windows to be rendered by a remote access client application or a browser-based client, as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 schematically illustrates an example component diagram of a remote access infrastructure in which the methods and systems described herein may be implemented. Computer systems, appliances, network segments, and other software or hardware components are shown in FIG. 1 for illustrative purposes only, and the scope of the present disclosure is not limited to the architecture shown in FIG. 1. Routers, firewalls, load balancers, network switches, and/or various other software or hardware components may be omitted from FIG. 1 for clarity. Various other computer systems, software or hardware components, and/or methods of their interconnection which are not shown in FIG. 1 may be compatible with the methods and systems described herein.

As schematically illustrated by FIG. 1, the distributed computer system 1000 may comprise one or more publishing servers 110 which may communicate, over a network 105, with one or more virtualized execution environments. In an illustrative example, the virtual execution environment may include one or more remote desktop servers 115. In another illustrative example, the virtual execution environment may include one or more virtual desktop interface (VDI) agents 120 running on respective host computer systems, such that each host computer system may execute one or more virtual machines. In yet another illustrative example, the virtual execution environment may include one or more guest agents 125, such that each guest agent runs in a guest operating system of a virtual machine executed by a host computer system. In yet another illustrative example, the virtual execution environment may include one or more remote personal computer (PC) agents 130 running on respective personal computers.

The publishing server 110 may selectively publish the applications running in the virtual execution environments. In an illustrative example, the publishing server 110 may facilitate the clients' access to the published applications only, rather than to the full desktop of the respective virtual execution environment, thus enforcing individual user's or user group's access rights to the applications running in the virtual execution environments, which may be configured via the administrative console of the publishing server 110.

In certain implementations, the publishing server 110 may further load balance the application traffic. In an illustrative example, the load balancing may be performed by selecting a least loaded virtual execution environment for launching a remote application. In an illustrative example, the load balancing may be performed by implementing a pre-defined load balancing scheme, such as the round robin scheme.

One or more client gateways 135 may be employed for facilitating communications, over network 138, of one or more client devices 140 with publishing servers 110 and/or virtualized execution environments 115, 120, 125, and 130. The client gateway 135 may act as a proxy between the client 140 and the publishing server 100 and/or between the client 140 and the selected virtual execution environment. In certain implementations, the client gateway 135 may tunnel all application traffic through a single port. In certain implementations, the client gateway 135 may encrypt all traffic forwarded to client 140 (e.g., by establishing a Secure Socket Layer (SSL) tunnel between itself and the client 140). In certain implementations, the client gateway 135 may further enforce certain licensing rules with respect to the publishing applications, e.g., by limiting a published application instance to a single session in order to disable application session sharing, allowing users to start only a single instance of a published application, and/or limiting the number of concurrently running instances of a published application.

In certain implementations, the client gateway 135 may enable browser-based client access to remote applications running in the virtualized execution environments. In order to enable the browser-based access, the client gateway 135 may serve, to the client 140, a JavaScript code for parsing the data received from a virtual execution environment and displaying the data by the client browser. The client browser may execute the received JavaScript in order to render each remote application's graphic output in a respective frame of a currently displayed HTML page, translate pointing device input into coordinates of the corresponding virtual execution environment, and/or process other graphical user interface (GUI) events. A system administrator may configure a web portal to display published remote applications in one or more HTML pages which may be accessed by HTML5-enabled browsers running on the client devices.

In certain implementations, the client gateway 135 in cooperation with the publishing server 110 may further facilitate associations of sticky notes with published applications. The publishing server 110 may store a sticky note definition data structure including a plurality of sticky note definition records associated with one or more published applications running in the virtual execution environments accessible via the publishing server 110.

As schematically illustrated by FIG. 2, the sticky note definition data structure 200 may be represented by an array of sticky note definition records 210A-210M. Each sticky note definition record 210 may include an identifier 215 of the corresponding sticky note, an identifier 220 of the published application with which the sticky notes is associated, an identifier 225 of the user who owns the sticky note, the access mode 230 of the sticky note (e.g., private, public, or shared), and identifiers 235 of one or more users and/or user groups which are authorized to access the sticky note having the shared access mode. Alternatively, the sticky note definition record may include a plurality of flags specifying access permissions (e.g., read and write) to the sticky node for its owner user, for the user group associated with the sticky note, and for other users.

The sticky note definition record 210 may further include the title of the sticky note 240, the text of the sticky note 245, and an identifier 250 of the color utilized for displaying the sticky note. In certain implementations, the sticky note definition record 210 may further include an identifier of a file associated with the sticky note (e.g., storing graphic or multimedia content) and/or other information or attributes, which are omitted from FIG. 2 for clarity and conciseness.

The sticky note definition data structure 200 may be indexed by the identifier 220 of the published application, thus enabling efficient retrieval of sticky note definition records associated with a specified published application. In an illustrative example, responsive to receiving a request to launch a published application running in a virtual execution environment, the client gateway 135 may retrieve, from the publishing server 110, definitions of the sticky notes associated with the published application identified by the request. The client gateway 135 may then identify a subset of retrieved sticky notes which are accessible by the user identified by the client request, including the sticky notes owned by the user, shared sticky notes which the user is authorized to access based on the content of the sticky note definition field 235 specifying users and/or user groups which are authorized to access the sticky note having the shared access mode, and/or public sticky notes.

Responsive to identifying the sticky notes which are accessible by the user identified by the client request, the client gateway 135 may cause the client 140 to render each identified sticky note in a respective popup window visual association with the main window of the published application. In an illustrative example, the client gateway 135 may transmit, to the client 140, executable code and/or graphic content for visually rendering the identified sticky notes. The executable code may be represented, e.g., by JavaScript code executable by the client browser for rendering the sticky notes. The graphic content may include definitions of the popup windows to be rendered by a remote access client application or a browser-based client.

Figure 3:
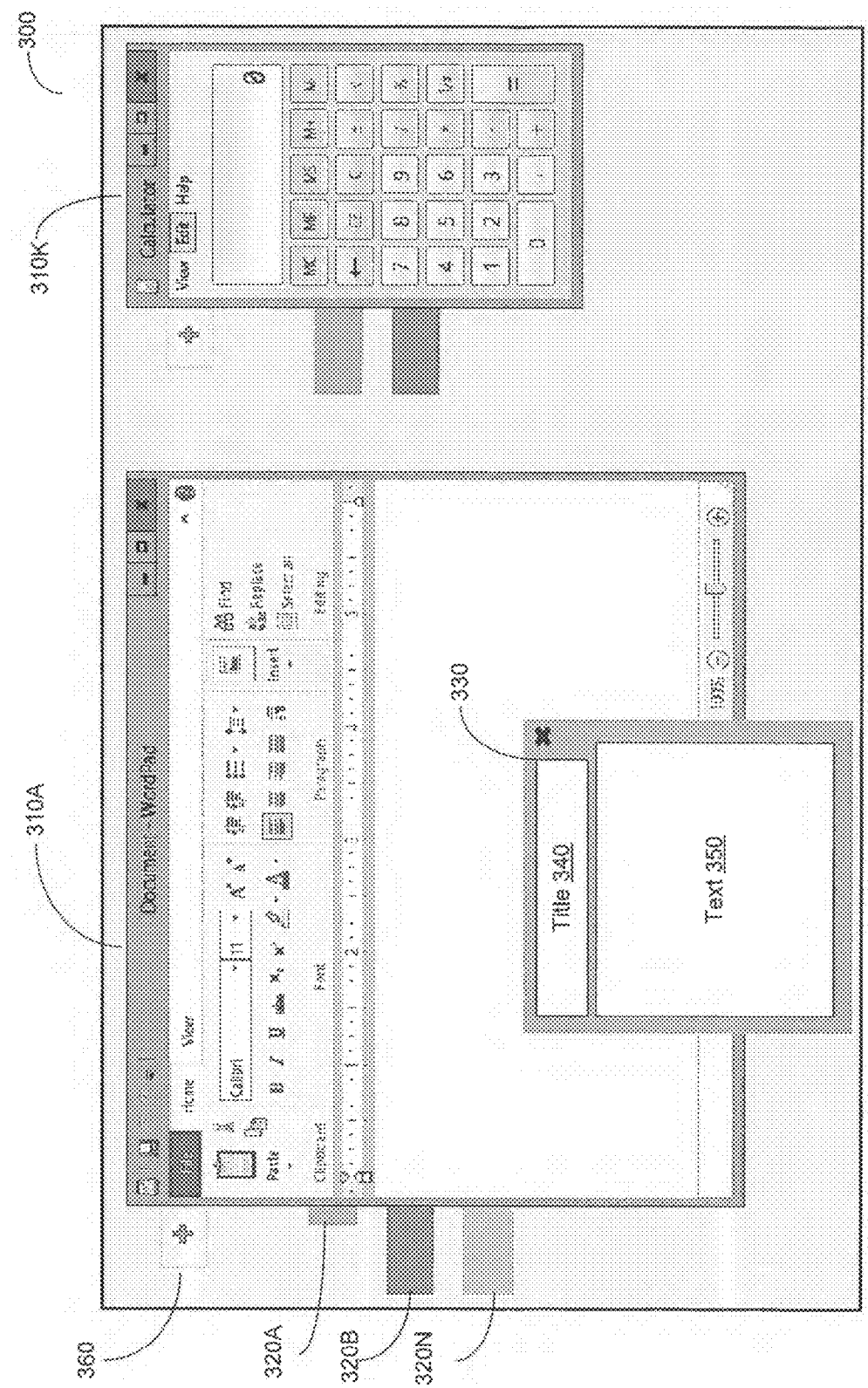
FIG. 3 schematically illustrated rendering sticky notes by the remote access client operating in accordance with one or more aspects of the present disclosure.

FIG. 3 schematically illustrated rendering sticky notes by the remote access client 140 operating in accordance with one or more aspects of the present disclosure. As shown in FIG. 3, the client desktop 300 may render one or more windows 310A-310K associated with the remotely executed published applications. The user of the client device may be authorized one or more sticky notes associated with the published application the output of which is rendered by the window 310A. The sticky notes may be visually represented by thumbnails 320A-320N which may be displayed in a visual association with the window 310 (e.g., each thumbnail 320 may be represented by a rectangle having a common edge with the window 310A). The user may select a sticky note thumbnail, e.g., the thumbnail 320A. Responsive to receiving the user's selection of the sticky note thumbnail 320A, the client may visually render the corresponding sticky note 330, including the title 340 and the text 350, in a visual association with the window 310A (e.g., the sticky note 330 may at least partially overlay with the window 310A), and may minimize the corresponding thumbnail 320A to reflect the displayed state of the sticky note 330. Responsive to receiving the user input modifying the text or the title of the sticky note, the client may store the modified text or title in the corresponding fields of the sticky note definition record. Responsive to receiving the user input closing or minimizing the sticky note 330, the client may restore the corresponding thumbnail 320A and transmit the modified sticky note definition record to the publishing server.

The client may further render a GUI control 360 for creating a new sticky note associated with the published application. Responsive to receiving the user's input activating the GUI control 360, the client may display a popup window for the newly created sticky note, and may accept user input specifying the title and the text of the sticky note. The client may further prompt the user to select the color of the sticky note and to specify the access mode (public, private, or shared) of the sticky note. Responsive to receiving the user's selection of the shared access mode, the client may further prompt the user to specify the users and/or user groups which are authorized to access the sticky note. Responsive to receiving the user input saving or closing the sticky note, the client may store the sticky note title, text, and attributes in a newly created sticky note definition record, and may transfer the newly created sticky note definition record to the publishing server. Responsive to receiving the newly created sticky note definition record, the publishing server may append the record to the array of sticky note definition records associated with the published application.

Figure 4:
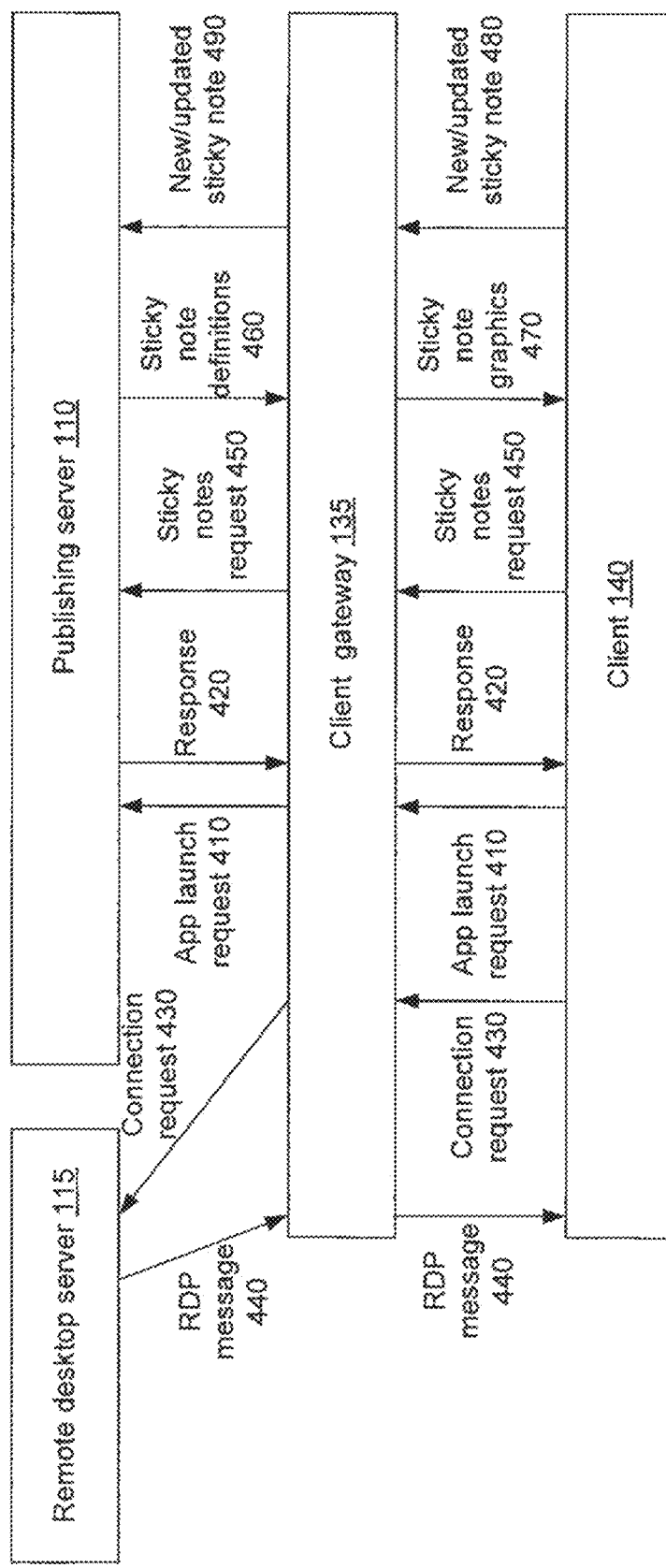
FIG. 4 illustrates an example workflow 400 for servicing an application launch request by the remote access infrastructure operating in accordance with one or more aspects of the present disclosure.

FIG. 4 illustrates an example workflow 400 for servicing an application launch request by the remote access infrastructure operating in accordance with one or more aspects of the present disclosure. The workflow 400 may be initiated by a GUI command selecting a published application for launching. Responsive to receiving the GUI command, the client 140 (represented by the remote access client application or by a browser-based client) may send an application launching request 410 via the client gateway 135 to the publishing server 110. The publishing server may apply a load balancing scheme to select a virtual execution environment (e.g., represented by the remote desktop server 115), and may respond to the client request 410 by a message 420 specifying an identifier of the selected remote desktop server 115 (e.g., an Internet Protocol (IP) address of the server 115).

Responsive to receiving the response 420, the client 140 may transmit, to the remote desktop server 115 via the client gateway 135, a connection request 430 specifying the user credentials (e.g., the user identifier and the user password). Responsive to successfully validating the user credentials, the remote desktop server initiates a new remote access session and transmits, to the client 140 via the client gateway 135, one or more RDP messages 440.

Responsive to receiving the RDP message 440 addressed to the client 140, the client gateway 135 may transmit, to the publishing server 110, a request 450 for the definitions of sticky notes associated with the published application being launched. The publishing server may respond by transmitting a message 460 including the requested sticky note definitions. The client gateway 135 may then identify a subset of retrieved sticky notes which are accessible by the user identified by the client request.

Responsive to identifying the sticky notes which are accessible by the user identified by the client request, the client gateway 135 may transmit, to the client 140, one or more messages 470 including executable code and/or graphic content for visually rendering the identified sticky notes. The executable code may be represented, e.g., by JavaScript code executable by the client browser for rendering the sticky notes. The graphic content may include definitions of the popup windows to be rendered by a remote access client application or a browser-based client.

Responsive to receiving, from the client 140, a message 480 including a definition of a newly created or a modified sticky note, the client gateway may forward the definitions, by a message 490, to the publishing server 110.

Figure 5:
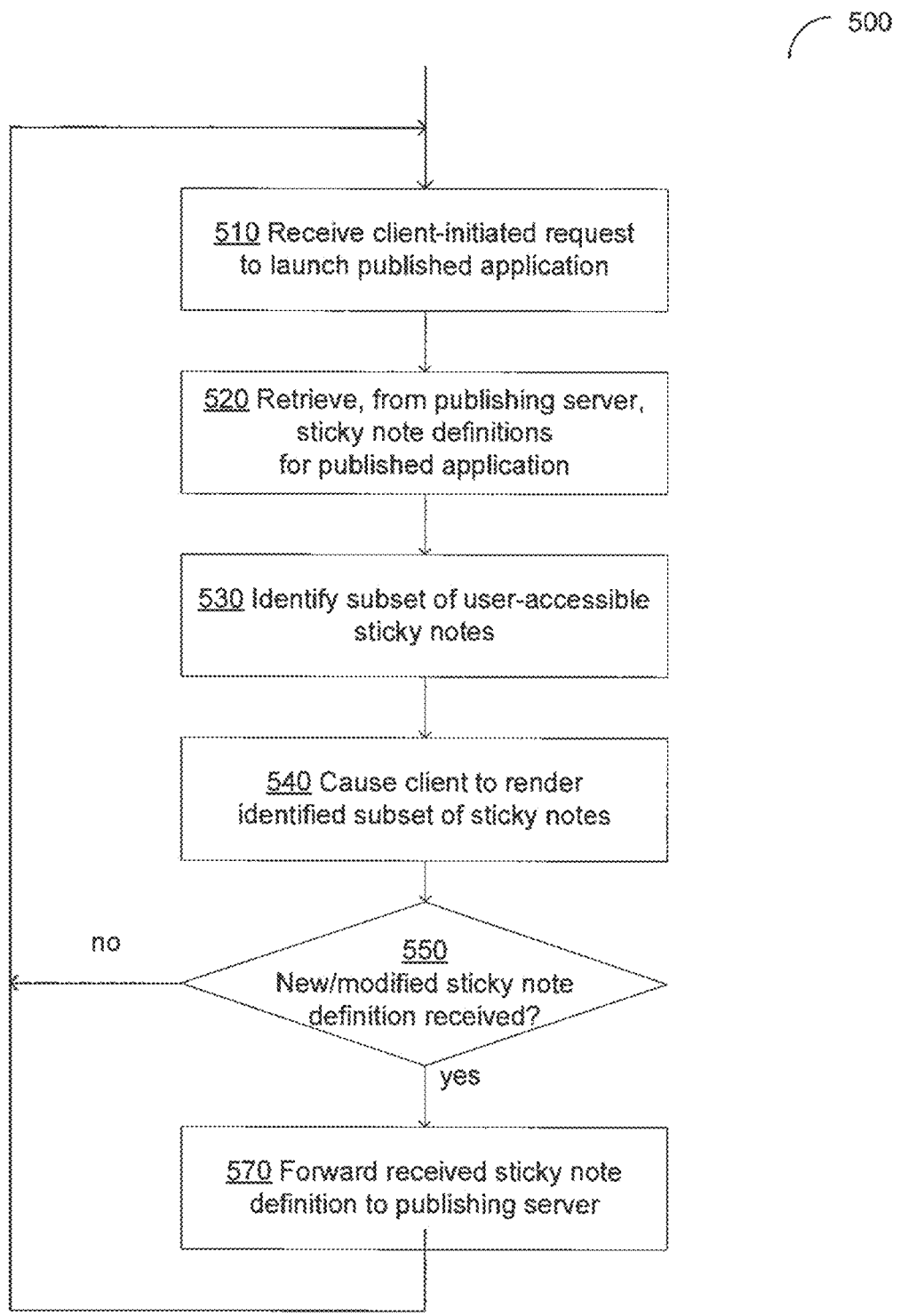
FIG. 5 depicts a flow diagram of an example method for implementing sticky notes associated with remotely executed applications by a client gateway operating in accordance with one or more aspects of the present disclosure.

FIG. 5 depicts a flow diagram of an example method 500 for implementing sticky notes associated with remotely executed applications by a client gateway operating in accordance with one or more aspects of the present disclosure. Method 500 and/or each of its individual functions, routines, subroutines, or operations may be performed by one or more processors of the computer system (e.g., the client gateway 135 of FIG. 1) implementing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, a client gateway implementing the method may receive a client-initiated request initiated to launch a published application executable by a virtual execution environment.

At block 520, the client gateway may retrieve, from a publishing server associated with the virtual execution environment, the sticky note definition records associated with the published application identified by the client request. Each sticky note definition record may specify the title of the sticky note, the text of the sticky note, the color to be utilized for rendering the sticky note, the access mode of the sticky note (e.g., the private access mode, the public access mode, or the shared access mode), the owner of the sticky note, and one or more users and/or user groups which are authorized to access the sticky note, as described in more detail herein above.

At block 530, the client gateway may identify a subset of retrieved sticky notes which are accessible by the user identified by the client request, including the sticky notes owned by the user, shared sticky notes which the user is authorized to access based on the content of the sticky note definition field specifying users and/or user groups which are authorized to access the sticky note having the shared access mode, and/or public sticky notes, as described in more detail herein above. In an illustrative example, the user credential supplied by the client request matches a sticky note owner specified by at least one sticky note definition record of the identified subset. In another illustrative example, the user credential supplied by the client request matches an authorized user specified by at least one sticky note definition record of the identified subset.

At block 540, the client gateway may cause the client to render, in a respective popup window visual association with the main window of the published application, each sticky note defined by the identified subset of sticky note definition records. In an illustrative example, the client gateway may transmit, to the client, executable code and/or graphic content for visually rendering the identified sticky notes. The executable code may be represented, e.g., by JavaScript code executable by the client browser for rendering the sticky notes. The graphic content may include definitions of the popup windows to be rendered by a remote access client application or a browser-based client.

Responsive to receiving from the client, at block 550, a definition of a newly created or a modified sticky note, the client gateway may, at block 560, forward the definition to the publishing server, and the method may loop back to block 510.

Figure 6:
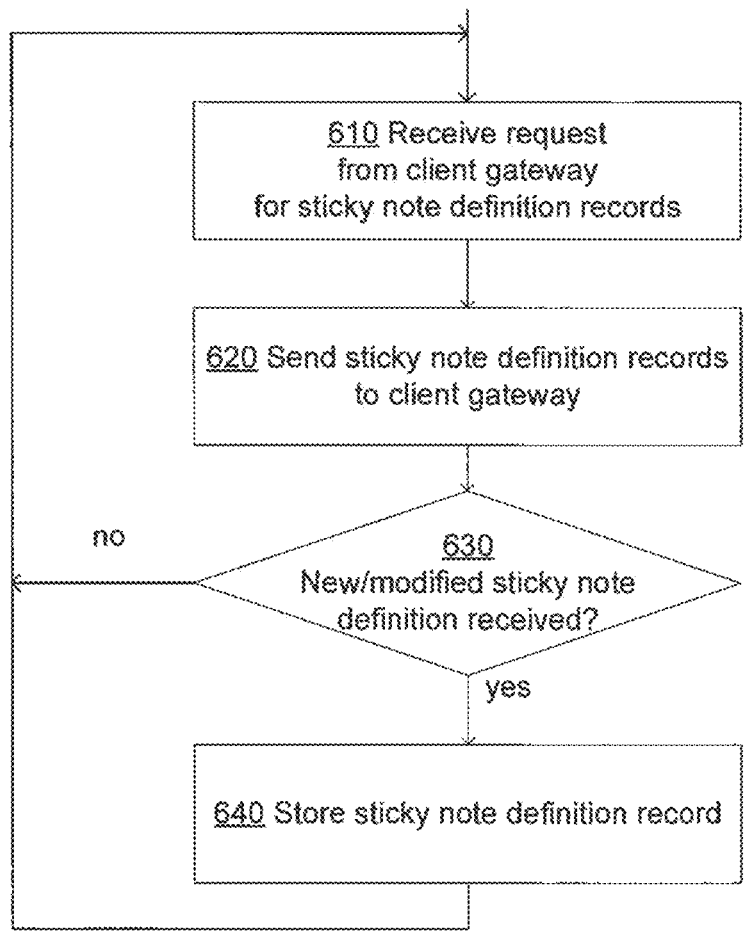
FIG. 6 depicts a flow diagram of an example method for implementing sticky notes associated with remotely executed applications by a publishing server operating in accordance with one or more aspects of the present disclosure.

FIG. 6 depicts a flow diagram of an example method 600 for implementing sticky notes associated with remotely executed applications by a publishing server operating in accordance with one or more aspects of the present disclosure. Method 600 and/or each of its individual functions, routines, subroutines, or operations may be performed by one or more processors of the computer system (e.g., the publishing server 110 of FIG. 1) implementing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other.

At block 610, a publishing server implementing the method may receive, from a client gateway, a request for the sticky note definition records associated with a specified published application.

At block 620, the publishing server may transmit, to the client gateway, a response comprising the sticky note definition records associated with a specified published application. Each sticky note definition record may specify the title of the sticky note, the text of the sticky note, the color to be utilized for rendering the sticky note, the access mode of the sticky note (e.g., the private access mode, the public access mode, or the shared access mode), the owner of the sticky note, and one or more users and/or user groups which are authorized to access the sticky note, as described in more detail herein above.

Responsive to receiving, at block 630, a new or updated sticky note definition record, the publishing server may, at block 640, store the received sticky note definition record in a file or a database table which is employed for storing the sticky note definition records associated with published application, and the method may loop back to block 610.

Figure 7:
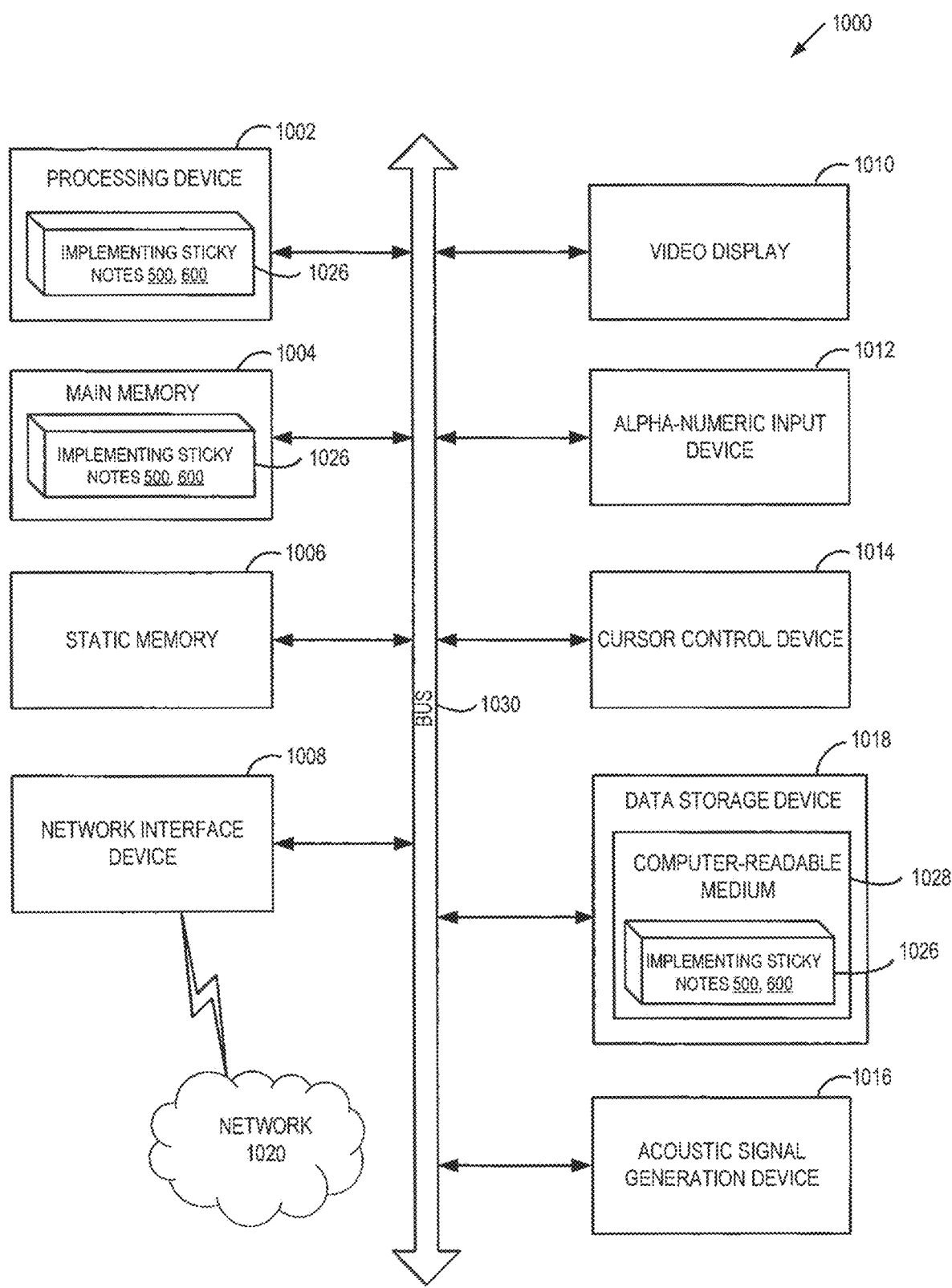
FIG. 7 depicts a block diagram of an example computer system operating in accordance with one or more aspects of the present disclosure.

FIG. 7 schematically illustrates a component diagram of an example computer system 1000 which may perform any one or more of the methods described herein. In various illustrative examples, computer system 1000 may represent the publishing server 110, client gateway 135, and/or client device 140 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing methods 500, 600 of implementing sticky notes associated with remotely executed applications.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of methods 500, 600 of implementing sticky notes associated with remotely executed applications.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 7 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required operations, functions, or methods. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising
providing a client gateway connected to a communications network comprising a processor and a memory storing computer executable instructions which when executed by the processor configure the client gateway to execute a process comprising:
- receive from a client device a client request initiated by a client to launch a published application;
- transmit the client request to a publishing server to establish the published application where the published application is established within a virtual execution environment upon a remote desktop server by the publishing server;
- transmit a request to the publishing server upon intercepting a response from the remote desktop server, the request being to retrieve definitions of a plurality of sticky note definition records from the publishing server, wherein each sticky note definition record of the plurality of sticky note definition records defines a sticky note associated with the published application;
- identify a subset of the retrieved definitions of the plurality of sticky note definition records accessible to the client identified in the client request; and
- transmit to the client device executable instructions and graphic content for visually rendering a sticky note defined by a sticky note definition record of the identified subset of the plurality of sticky note definition records; wherein
- the executable code is executable by a browser application in execution upon the client device for rendering the identified subset of the plurality of sticky note definition records; and
- the graphic content causing a respective pop-up window to be rendered in visual association with a window of the launched remote published application within the browser application each sticky note of the identified subset of the plurality of sticky note definition records.

2. The method according to claim 1, wherein
the publishing server facilitates access to the published application only thereby enforcing at least one of the client's individual access rights and access rights of a user group of which the client is a member.

3. The method according to claim 1, wherein
the computer executable instructions further configure the client gateway to enforce licensing rules of the published application.

4. The method of claim 1, wherein
each sticky note definition record of the plurality of sticky note definition records specifies an access mode of the sticky note, wherein the access mode is provided by one of: a private access mode, a public access mode, or a shared access mode.

5. The method according to claim 1, wherein
the connection request was established in response to a message from the publishing server specifying an identifier of a selected remote desktop server providing the virtualization environment for launching the published application.

6. The method according to claim 1, wherein
the sticky note definition record of the identified subset of the plurality of sticky note definition records includes a definition of the pop-up window to be rendered by a remote access client application.

7. The method of claim 1, wherein
each sticky note definition record of the plurality of sticky note definition records specifies an identity of a user authorized to access the sticky note.

8. The method of claim 1, wherein
identifying a subset of the retrieved definitions of the plurality of sticky note definition records accessible to the client identified in the client request comprises matching a user credential supplied with the client request with the identities of owners specified within the retrieved definitions of the plurality of sticky note definition records.

9. The method of claim 1, further comprising:
identifying a subset of the retrieved definitions of the plurality of sticky note definition records accessible to the client identified in the client request comprises matching a user credential supplied with the client request with the identities of authorized users specified within the retrieved definitions of the plurality of sticky note definition records.

10. The method according to claim 1, wherein
the sticky note definition record of the identified subset of the plurality of sticky note definition records includes a definition of the pop-up window to be rendered by a browser based client application.

11. The method according to claim 1, wherein
each sticky note definition record includes one or more flags, each flag specifying access permissions for content associated with the sticky note associated with the sticky note definition record with respect to one of the client when the client created the content, a user group associated with the sticky note definition record of which the client is a member, and other users.

12. The method according to claim 1, wherein
each sticky note definition record includes an identifier of a file associated with the sticky note associated with the sticky note definition record; wherein
the file stores graphic content or multimedia content.

13. The method according to claim 1, wherein
the plurality of sticky note definition records are stored within a data structure associated with a group of published applications running in virtual execution environments of which the published application is a member of the group.

14. The method according to claim 1, wherein
the plurality of sticky note definition records are stored within a data structure associated with a group of published applications running in virtual execution environments of which the published application is a member of the group; and
the data structure is indexed by identifiers of the group of publications.

15. The method according to claim 1, wherein
rendering the identified subset of the plurality of sticky note definition records comprises rendering a plurality of thumbnails, each thumbnail of the plurality of thumbnails associated with a sticky note associated with a predetermined sticky note definition record of the identified subset of the plurality of sticky note definition records.

16. The method according to claim 1, wherein
the executable code transmitted by the publishing server to the client device performs a sub-process comprising:
 rendering the identified subset of the plurality of sticky note definition records as a plurality of thumbnails, each thumbnail of the plurality of thumbnails associated with a sticky note associated with a predetermined sticky note definition record of the identified subset of the plurality of sticky note definition records;
 determining whether the user selects a thumbnail of the plurality of thumbnails;
 upon a positive determination that the user selects a thumbnail of the plurality of thumbnails render the sticky note associated with the predetermined sticky note definition record of the identified subset of the plurality of sticky note definition records associated with the selected thumbnail of the plurality of thumbnails;
 determining whether the user selects a rendered sticky note;
 upon a positive determination that the user selects a rendered sticky note minimizing the rendered sticky note back to a thumbnail of the plurality of thumbnails.

17. The method according to claim 1, wherein
the executable code comprises code for:
 rendering a graphical user interface (GUI) control for creating a new sticky note to be associated with published application;
 determining selection of the GUI control by the client and providing the client with a pop-up window allowing the client to configure a new sticky note; and
 determining at least one of a saving and closing operation by the client with respect to the pop-up window;
 transmitting a new sticky note definition record to the publishing server via the client gateway established in dependence upon the client's actions with respect to the pop-up window; and
the publishing server comprises second computer executable instructions which when executed by the publishing server configure the publishing server to:
 receive the new sticky note definition record from the client device via the client gateway; and
 append the new sticky note definition record to an array of sticky note definition records associated with the published application.

18. The method according to claim 1, wherein
the executable code comprises code for:
 rendering a graphical user interface (GUI) control for creating a new sticky note to be associated with published application;
 determining selection of the GUI control by the client and providing the client with a pop-up window allowing the client to configure a new sticky note; and
 determining at least one of a saving and closing operation by the client with respect to the pop-up window;
 transmitting a new sticky note definition record to the publishing server via the client gateway established in dependence upon the client's actions with respect to the pop-up window; and
the publishing server comprises second computer executable instructions which when executed by the publishing server configure the publishing server to:
 receive the new sticky note definition record from the client device via the client gateway; and
 append the new sticky note definition record together with an identifier of the published application to a data structure storing a plurality of sticky note definition records associated with a group of published applications supported by the publishing server of which the published application is a member.

19. The method according to claim 1, wherein
the response intercepted by the client gateway from the remote desktop server is one or more remote desktop protocol messages relating to the establishment of a new remote access session upon the remote desktop server for execution of the published application.

* * * * *